US010360602B2

(12) United States Patent
Devendra et al.

(10) Patent No.: US 10,360,602 B2
(45) Date of Patent: Jul. 23, 2019

(54) METERING ACCELERATOR USAGE IN A COMPUTING SYSTEM (71) Applicant: International Business Machines Corporation, Armonk, NY (US)

(72) Inventors: Saravanan Devendra, Bangalore (IN); Venkatesh Sainath, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 828 days.

(21) Appl. No.: 14/883,717

(22) Filed: Oct. 15, 2015

(65) Prior Publication Data

US 2017/0109801 A1 Apr. 20, 2017

(51) Int. Cl.
H04L 12/66 (2006.01)
H04W 72/04 (2009.01)
G06Q 30/04 (2012.01)
H04L 9/32 (2006.01)
G06F 13/40 (2006.01)
G06F 9/50 (2006.01)
H04L 12/931 (2013.01)

(52) U.S. Cl.
CPC ............ G06Q 30/04 (2013.01); G06F 9/5077 (2013.01); G06F 13/4027 (2013.01); H04L 9/3247 (2013.01)

(58) Field of Classification Search
CPC .................................................. G06Q 20/145
USPC .......................................................... 705/34
See application file for complete search history.

(56) References Cited

U.S. PATENT DOCUMENTS 8,826,277 B2 * 9/2014 Chang ................. G06F 9/45545 707/602
2013/0139152 A1 * 5/2013 Chang ................. G06F 9/45545 718/1
2014/0324650 A1 * 10/2014 Bligh ..................... G06Q 20/14 705/34

OTHER PUBLICATIONS

IBM, "Method and System to Charge CPU processing units to Client Partitions based on the Utilization of Virtual I/O Operations," An IP.com Prior Art Database Technical Disclosure, ip.com, Original Publication Date: Jun. 11, 2008, IP.com Electronic Publication: Jun. 11, 2008, 3 pages, http://null/IPCOM/000171482.
Mell et al., "The NIST Definition of Cloud Computing: Recommendations of the National Institute of Standards and Technology," U.S. Department of Commerce, Special Publication 800-145, Sep. 2011, 7 pages, Gaithersburg, MD.

* cited by examiner

Primary Examiner — Talia F Crawley
(74) Attorney, Agent, or Firm — Robert J. Shatto (57) ABSTRACT A method for metering accelerator usage in a computing system includes receiving, from an accelerator, a set of metering rules, the metering rules including a unit of accelerator usage and a tariff per unit of accelerator usage. The unit of accelerator usage corresponds with an amount of work performed by the accelerator in executing data processing operations. The method may further include receiving on a first bus from a partition of the computing system a command block, the command block having data processing operations executable by the accelerator. The method may additionally include calculating, based on the command block and the set of metering rules, an accelerator usage value for the partition. The method may then include providing, on a second bus, the accelerator usage value.

20 Claims, 6 Drawing Sheets

METERING ACCELERATOR USAGE IN A COMPUTING SYSTEM

BACKGROUND

The present disclosure relates to computer hardware, and more specifically, to an architecture for metering usage of computer system hardware accelerators having a self-advertising tariff plan.

In cloud computing environments, computer systems may be offered to clients in an infrastructure as a service (IAAS) model. The IAAS model may include providing entire computer systems, including input/output devices and accelerators, to end customers. The end customers may install virtualization software, such as a hypervisor, and virtualize the use of the provided system by allocating usage of the provided system's resources on a per partition basis. Alternatively, the end customers may use the provided system as a bare metal system having a single partition. In either scenario, the costs of acquiring and using the computer systems may be mitigated by charging end customers for their usage of individual hardware components of the computer system.

SUMMARY

According to embodiments of the present disclosure, a method for metering accelerator usage in a computing system includes receiving, from an accelerator, a set of metering rules, the metering rules including a unit of accelerator usage and a tariff per unit of accelerator usage. The unit of accelerator usage corresponds with an amount of work performed by the accelerator in executing data processing operations. The method may further include receiving on a first bus from a partition of the computing system a command block, the command block having data processing operations executable by the accelerator. The method may additionally include calculating, based on the command block and the set of metering rules, an accelerator usage value for the partition. The method may then include providing, on a second bus, the accelerator usage value.

Various embodiments are directed towards systems and computer program products for metering accelerator usage in a computing system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer hardware, more particular aspects relate to an architecture for metering usage of computing system hardware accelerators having a self-advertising tariff plan. While the present disclosure is not necessarily limited to such applications, various aspects of the disclosure may be appreciated through a discussion of various examples using this context.

Embodiments of this disclosure are based on the recognition that computing systems provided to customers in infrastructure as a service models may be configured with a number of hardware accelerators (hereinafter "accelerators"), each of which may be engineered to perform disparate processing tasks. Tasks performed by these accelerators may include video compression, video rendering, database processing, pattern recognition, and image processing. As used herein, accelerators may include certain electronic circuits, such as flexible programmable logic arrays, within computer systems for performing units of processing work. An accelerator may be coupled to a computing system, or a processor of a computing system, by a coherent accelerator processor interface (CAPI). Under an IAAS model, computing systems may be provided without software from a service provider. Consequently, the provided computing systems may lack software for tracking customer usage (e.g., on a per partition basis in a virtualized environment), for providing access to customer usage statistics for charging customers based on their usage, and/or for calculating charges based on the type of accelerator being used to perform processing tasks.

Embodiments of the present disclosure are directed towards an architecture (e.g., a system, method, and computer program product) for metering (e.g., monitoring and calculating usage rate) of computing system accelerators. The architecture includes providing computer systems with accelerators that self-advertise a set of metering rules for calculating accelerator usage on a per partition basis. Processing components within a CPU may read the metering rules from a memory of the accelerators when, for example, a computer system is powered on. In some embodiments, the processing components may update a usage table according to the metering rules when a partition (e.g., a customer) performs a processing operation using an accelerator (e.g., read or write operation). In other embodiments, the processing components may provide partition information along with requested processing operations to the accelerator. The accelerator may then update the usage table according to the received partition information and processing operations. In embodiments, usage data may be subsequently extracted via special original equipment manufacturer (OEM) commands.

As used herein, metering rules may include a set of values for tracking usage of an accelerator and for calculating a tariff associated with the usage. More specifically, metering rules may include a unit of accelerator usage (or unit of work) associated with operations performed by the accelerator on the behalf of a customer. A unit of accelerator usage may be a number of bytes per unit of time transferred from a central processing unit to an accelerator for a given write operation. A unit of accelerator usage may also include a number of bytes transferred, per unit of time, from an accelerator to a central processing unit for a given read operation. In some embodiments, metering rules may also include a tariff associated with each unit of accelerator usage. The tariff may correspond with a cost to a customer for a unit of accelerator usage performed by an accelerator on the behalf of the customer. In certain embodiments, metering rules may be based on other metrics, such as the number of operations performed by an accelerator and/or an amount of time an accelerator expends executing operations.

Each accelerator in a computing system may include a set of metering rules. The set of metering rules associated with an accelerator may be stored in a memory of the accelerator (e.g., a read-only-memory) according to a defined format. The defined format may indicate a format for storing the rules in a memory of the accelerator (e.g., encrypted according to a given encryption key and/or algorithm), as well as a format for the physical representation of the rules (e.g., a number of bytes allocated to each rule, and/or the meaning of certain fields within a string representing a rule). In certain embodiments, accelerators may include a software layer (e.g., International Business Machines Corporation's Power Software Layer), or electrical circuits for providing access to the metering rules.

In some embodiments, the metering rules may be encrypted or signed with a digital key or digital signature. The digital key may provide a mechanism (e.g., via private-public key algorithm) for verifying the authenticity of an accelerator and a set of metering rules to a computing system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
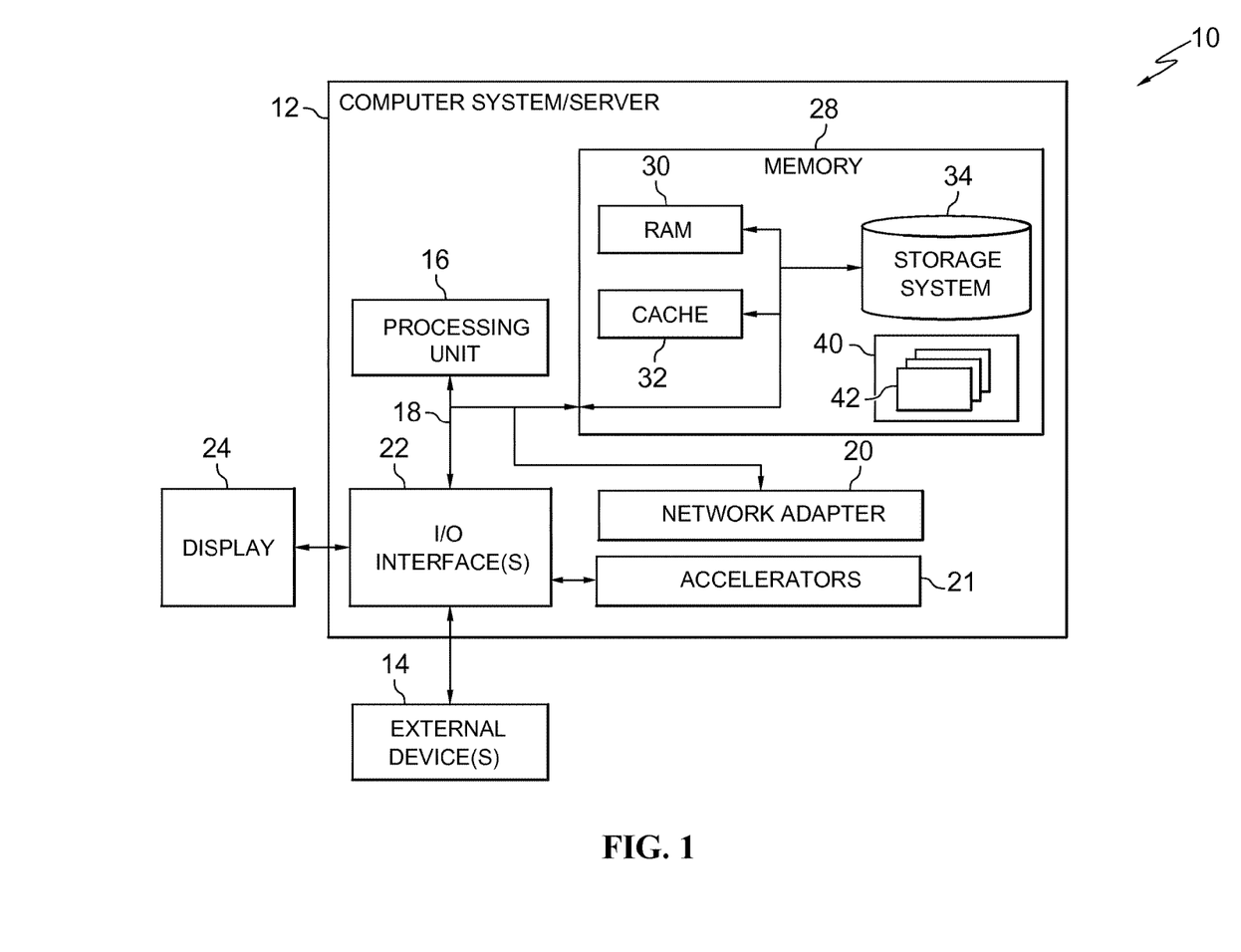
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus (e.g., PCI Express).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In embodiments, the I/O interfaces 22 may include a coherent accelerator processor interface for extending a processor coherency domain to include accelerators 21, as described herein.

Figure 2:
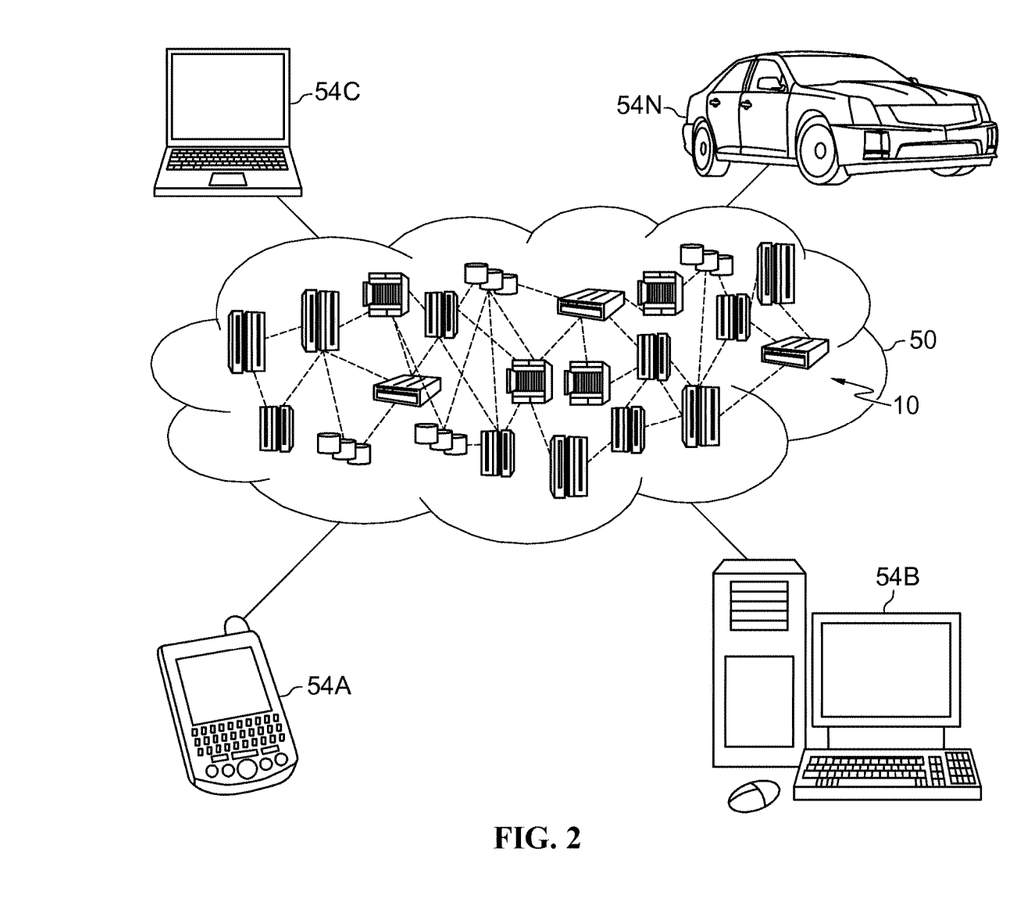
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
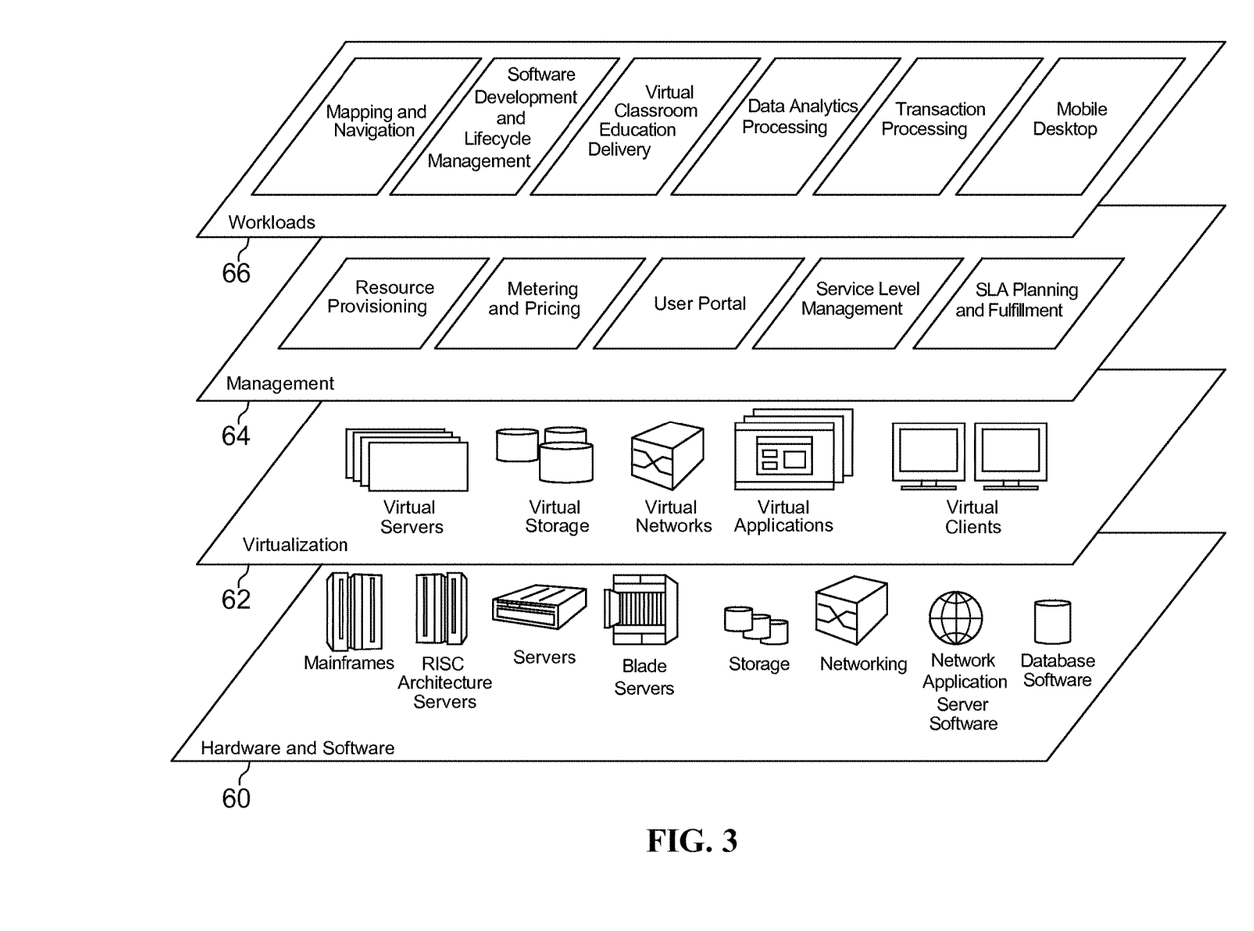
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
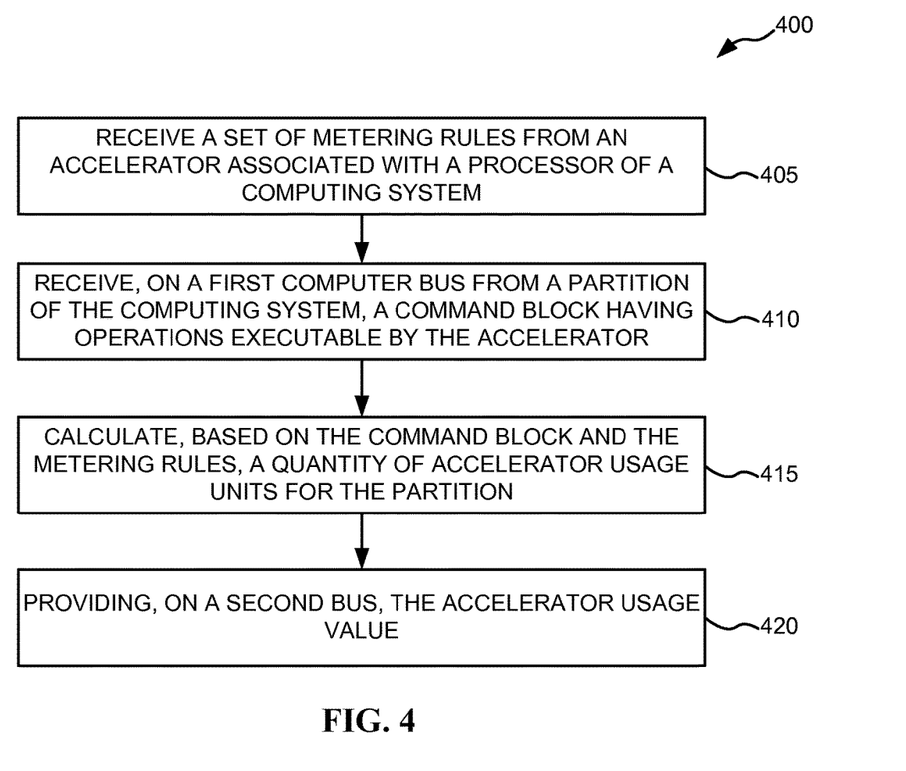
FIG. 4 depicts a flowchart of operations of an architecture for metering usage of a computing system's hardware accelerators having a self-advertising tariff plan, according to various embodiments.

Referring now to the figures, FIG. 4 depicts a flowchart 400 of operations of an architecture for metering usage of computing system hardware accelerators having a self-advertising tariff plan, according to various embodiments. In some embodiments, the operations of the flowchart 400 may be performed by a software and/or firmware application (hereinafter monitor application) executing on processor of the computing system, such as computer system 12 (FIG. 1). In some embodiments the computing system may be a hardware component (e.g., a mainframe, or server) associated with layer 60 of the cloud computing environment shown in FIG. 3. In certain embodiments, components or a portion of monitor application may be stored in a memory of, and execute on, a service processor or part of a coherently attached processor proxy (CAPP). In particular embodiments, the components or a portion of the monitor application may be stored in a memory of an accelerator, and may execute in a software layer of the accelerator.

The monitor application may begin the operations of the flowchart 400 by receiving a set of metering rules from an accelerator associated with a processor of a computing system, consistent with operation 405. The monitor application may actuate one or more circuits in the accelerator (e.g., by performing a read operation on an area of memory of the accelerator) to cause the accelerator to provide the metering rules. In some embodiments, the monitor application may receive the metering rules during or after the initialization of the computing system. In other embodiments, the monitor application may receive the metering rules at a time during the operation of the computing system.

The monitor application may proceed through the flowchart 400 by executing operation 410. Executing operation 410 may include receiving a command block having operations executable by an accelerator. The command block may be received, for example, from a component of layer 66 of a cloud computing environment depicted in FIG. 3. A command block may be received on a command/data communication bus (e.g., a first computer bus) of a computing system. In some embodiments, a command block may include operations to be performed by an accelerator. A command block may further include a set of data to be operated on by an accelerator. A command block, for example, may include operations directing an accelerator to encrypt a block of text along with set of data including the block of text to encrypt.

The monitor application may receive a command block from a process or application executing in a partition of the computing system. The process or application may generate a command block by requesting execution of an operation requiring computation or processing by an accelerator. The requested operation and an identifier associated with the partition requesting the operation may be received by a virtualization manager, as may be found on management layer 64 of the cloud computing environment described in FIG. 3. The virtualization manager may provide the received operation and partition identifier to a processing device (e.g., a CPU) associated with an accelerator for processing the operation. The monitor application executing within the processing device may then receive the requested operation and associated identifier in a command block from the command/data communication bus.

The flowchart 400 may be continued by calculating an accelerator usage value for the partition from which the monitor application received the command block in operation 410 (e.g., as indicated by operation 415). The accelerator usage value may be calculated based on the received command block and a set of metering rules associated with an accelerator that will process the operations of the command block. As an example, a set of metering rules may indicate that a unit of accelerator usage for an encryption operation is 1000-bytes written to an encrypting accelerator per second. A received command block having operations for encrypting a 10,000-byte block of text may generate an accelerator usage value of 10 units of accelerator usage when the accelerator can receive text for encryption at a rate of 1000-bytes per second. The 10 units of accelerator usage may be attributed to the partition generating the command block.

The monitor application may store accelerator usage values for each partition in a table in a memory of the computing system (e.g., in a memory of a CAPP, or in a memory associated with a software layer of an accelerator). The accelerator usage values for partitions that have used an accelerator may be stored in an accelerator table associated with the accelerator. The accelerator usage table may include a record having a column for a partition identifier (partition ID), and columns for accelerator usage values for operations (e.g., reads, writes, encrypt, and/or decrypt) performed by an accelerator on the behalf of a partition associated with the partition ID. In some embodiments, an accelerator usage table record may store accelerator usage values for a single instance of an operation executed by an accelerator (e.g., a number of units of accelerator usage accrued in the execution of a single read operation for a partition). In other embodiments, an accelerator usage table record may store cumulative accelerator usage values (e.g., a total number of units of accelerator usage accrued executing read operations for a partition). In still other embodiments, an accelerator usage table record may store a cost attributed to a partition's use of an accelerator. The cost may be determined from the partition's usage of an accelerator, as well as a tariff associated with the usage.

In some embodiments, an accelerator usage table may be stored in a plurality of locations in memory. In double buffer storage model, for example, a first table may be stored in a first memory location while a second table may be stored in a second location in memory. The first table may then be updated with accelerator usage values until the table is filled (e.g., until additional records cannot be added to the table, and/or there is not sufficient memory available to further update table records), and/or operations being performed on the first table (e.g., reading the contents of the table) limit the computing systems ability to update the first table. Updates may then continue in the second table.

The monitor application may further continue the operations of the flowchart 400 by executing operation 420. Executing operation 420 may include providing accelerator usage values to a service provider and/or other billing entity to charge customers for their usage. In some embodiments, the monitor application may receive a command requesting accelerator usage values on a second communication bus of the computing system (e.g., along an out-of-band path). In some embodiments, the second bus may be an auxiliary communication bus, different from the first bus. In other embodiments, the second bus may be the same bus as the first bus. The second computer system bus may be configured to issue OEM commands to, and receive data from, a CAPP unit, Service Processor, or other processing component having access to accelerator usage values calculated and stored in operation 415. The monitor application may, in response to receiving a command requesting access to the accelerator usage values, may provide the usage values on the second bus. The accelerator usage values may be forwarded to an external computing system or management entity.

Figure 5:
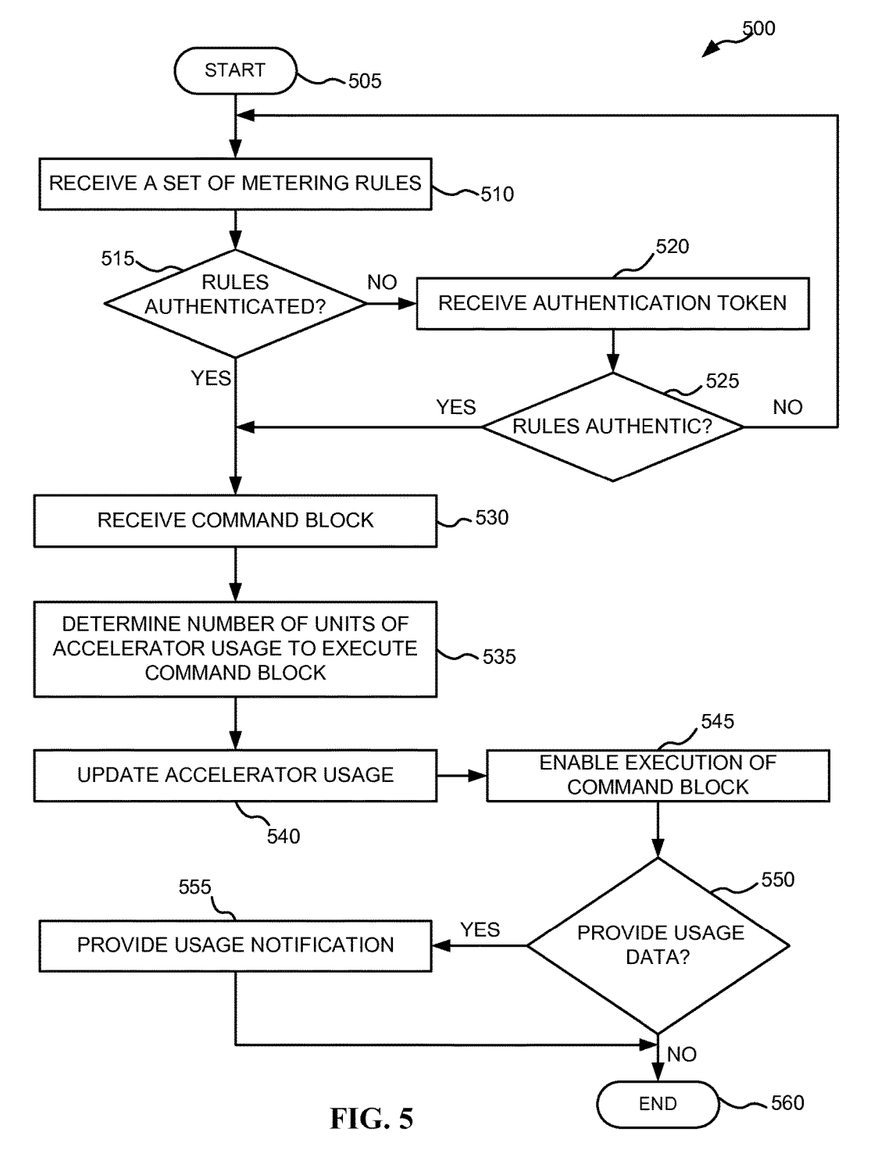
FIG. 5 depicts a flowchart of operations of an architecture for metering usage of computing system's hardware accelerators having a self-advertising tariff plan, according to various embodiments.

FIG. 5 depicts a flowchart 500 of operations of an architecture for metering usage of computing system hardware accelerators having a self-advertising tariff plan, according to various embodiments. In some embodiments, the operations of the flowchart 500 may be performed by a monitor application executing on processor of the computing system. In some embodiments the computing system may be a hardware component (e.g., a mainframe, or server) associated with layer 60 of the cloud computing environment shown in FIG. 3. In certain embodiments, components or a portion of the monitor application may be stored in a memory of, and may execute on, a service processor or a CAPP. In particular embodiments, components or a portion of the monitor application may be stored in a memory of an accelerator, and may execute in a software layer of the accelerator. The monitor application may begin the operations of the flowchart 500 at operation 505.

Operation 510 may be executed by receiving a set of metering rules from an accelerator. The metering rules may be received by a monitor application executing on a service processor and/or a software layer of an accelerator, as described in operation 405 (FIG. 3). In some embodiments, executing operation 510 may additionally include receiving, from the accelerator, an authentication token for authenticating the validity of the received metering rules. The authentication token may include data signed with an encryption key (e.g., a digital signature associated a public-private-key encryption/authentication algorithm). In certain embodiments, the authentication token may be signed with a first encryption key, available to a service provider or other provider of a computing system. In particular embodiments, the authentication token may be include the metering rules.

The monitor application may continue the flowchart 500 at operation 515 by determining whether the received metering rules were previously authenticated. The monitor application may determine whether the received metering rules were previously authenticated by, for example, examining a flag or data value associated with the metering rules of a given accelerator. The flag or data value may be cleared (e.g., indicate that associated metering rules are not authenticated) at system initialization. The flag or data value may be set and stored in a memory of the computer system when the monitor application authenticates the metering rules (e.g., during the execution of operation 525). The monitor application may proceed to operation 520 when the metering rules have not been authenticated, while the monitor application may proceed to operation 530 when the metering rules have been authenticated.

The monitor application may execute operation 520 by receiving an authentication token from an accelerator. In some embodiments, the authentication may be received along with the metering rules, as described in operation 510. In other embodiments, the monitor application may request (e.g., by executing a read operation) the authentication token from the accelerator.

The monitor application may execute operation 525 by authenticating the validity of the received metering rules. An authentication token received in operation 520 (or operation 510) together with a second encryption key stored in a memory of the computing system (e.g., in a memory of the service processor, and or a memory accessible by a software layer of an accelerator) may authenticate the received metering rules according to available public-private-key encryption/authentication algorithms. The monitor application may return to operation 510 when the metering rules cannot be authenticated. Returning to operation 510 may include restricting or limiting a partition's access to an accelerator whose metering rules cannot be authenticated. The monitor application may continue to operation 530 when the received metering rules are authenticated.

The monitor application may execute operation 530 by receiving a command block from a partition of the computing system. The command block may be received on a first command/data communication bus and stored in a memory accessible to the monitor application, as described in operation 410 (FIG. 4).

The monitor application may execute operation 535 by determining the number of units of accelerator usage (or accelerator usage values) required to execute the operations of the received command block. The number of units of accelerator usage may be determined computationally, as described in operation 415 (FIG. 4).

The monitor application may execute operation 540 by updating an accelerator usage table, as described in operation 415 (FIG. 4). The monitor application may then enable the accelerator to execute the received command block, consistent with operation 545. In some embodiments, the monitor application may enable execution of the received command block by transferring the command block to the accelerator and actuating a circuit in the accelerator to perform the operations of the command block.

The monitor application may continue the operations of the flowchart 500 by executing operation 550. Operation 550 may be executed by determining whether to provide the accelerator usage data to a service provider or other billing/managing entity. In some embodiments, the monitor application may determine to provide the usage data when the monitor application receives a request to provide the usage data (e.g., via an OEM command received on an auxiliary communication bus). The monitor application may provide a usage notification (e.g., as shown in operation 555), including the usage data, in response to determining to provide the usage data. The monitor application may then continue to operation 560 and end execution of the operations of the flowchart 500.

Figure 6:
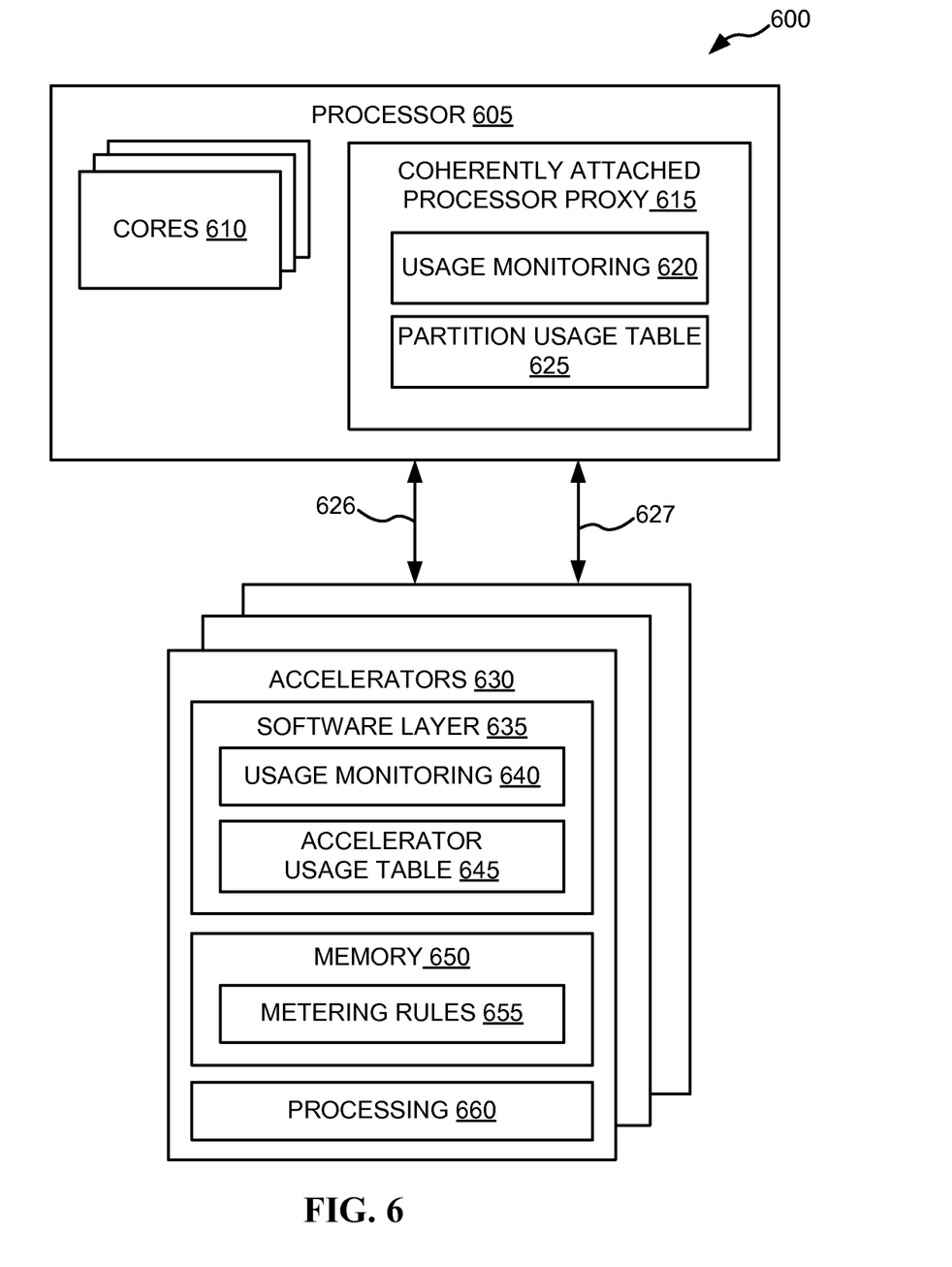
FIG. 6 depicts a block diagram of a processing component of a computing system for implementing an architecture for metering usage of computer system hardware accelerators having a self-advertising tariff plan, according to various embodiments.

FIG. 6 depicts a block diagram of a processing component 600 of a computer system for implementing an architecture for metering usage of computer system hardware accelerators having a self-advertising tariff plan, according to various embodiments. The processing component 600 may be a processing component of a computing system found in layer 60 of a cloud computing environment such as the cloud computing environment shown in FIG. 3.

The processing component 600 includes processor 605 and accelerators 630. In some embodiments, the processor 605 may be coupled to accelerators 630 by a communications bus 626 (e.g., a peripheral component interconnect bus, PCI) and supporting hardware/firmware (e.g., International Business Machines corporation's PCI Host Bridge, PHB). A second communications bus 627 may provide out of band communication (e.g., via private or secure OEM commands) between the accelerators 630, the processor 605, and external entities such as a cloud service provider.

The processor 605 may include processing cores 610 and service processor 615. The service processor 615 may be a coherently attached processor proxy, as described herein. In certain embodiments, the service processor 615 may include a usage monitoring component 620 for calculating, storing, and providing accelerator usage data. The service processor 615 may further include accelerator usage tables 625. In these embodiments, the service processor 615 may perform some or all of the functions of the monitor application described herein.

Accelerators 630 may include software layer 635, memory 650 and processing components 660. In some embodiments, software layer 635 may include usage monitoring component 640 and accelerator usage table 645. In these embodiments, the service processor 615 may provide command blocks, along with partition identifiers to accelerators 630. The accelerators 630 may then execute the operations of the command blocks, while components of the monitor application executing on software layer 635 may track accelerator usage for each partition, as described herein. Additional components of the monitor application executing within the service processor 615 may query the accelerators 630 (e.g., via OEM commands) to provide accelerator usage data in response to requests from, for example, a service provider.

The memory 650 may include persistent memory for storing metering rules 655. The memory 650 may additionally store authentication tokens, as described herein. Processing component 660 may execute specific functions of the accelerators 630 (e.g., data compression and encryption) in response to operations of a received command block.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for monitoring accelerator usage in a computing system having one or more accelerators, comprising:
    receiving, from an accelerator that is communicatively coupled to a processor in the computing system, a set of metering rules, the metering rules including a unit of accelerator usage and a tariff per unit of accelerator usage, the unit of accelerator usage corresponding with an amount of work performed by the accelerator in executing data processing operations;
    receiving on a first bus from a partition of the computing system a command block, the command block having data processing operations executable by the accelerator;
    calculating, based on the command block and the set of metering rules, an accelerator usage value for the partition;
    transmitting the command block to the accelerator for processing;
    enabling the accelerator to execute the command block; and
    providing, on a second bus, the accelerator usage value.

2. The method of claim 1, wherein the unit of accelerator usage includes at least one of a number of a units of data per unit of time transferred to the accelerator from a processor of the computing system per write operation, and a number of a units of data per unit of time transferred from the accelerator to the processor of the computing system per read operation.

3. The method of claim 1, wherein the accelerator usage value includes at least one of a count of units of accelerator usage associated with executing operations of the command block, and a tariff associated with executing operations of the command block.

4. The method of claim 1, wherein the metering rules are encrypted, the method further comprising:
    receiving, from the accelerator, an authentication token to authenticate the set of metering rules, the authentication token including data signed with an encryption key;
    verifying an authenticity of the metering rules using the authentication token and a second encryption key stored in a memory of the computing system; and responsive to determining that the metering rules cannot be authenticated, restricting the partition's access to the accelerator.

5. The method of claim 1, wherein calculating comprises:
actuating one or more circuits of the accelerator to cause the accelerator to measure a number of units of accelerator usage used to execute data processing operations of the command block; and
determining an accelerator usage from the number of units of accelerator usage and the tariff per unit of accelerator usage.

6. The method of claim 1, further comprising:
updating, in response to the calculating, a usage record associated with the accelerator, the usage record indicating at least one of a cumulative count of units of accelerator usage associated with the partition, and a cumulative count of accelerator usage values associated with the partition; and
providing, on the second bus, the usage record.

7. A system, comprising:
one or more computing nodes having a memory and a processor, wherein the processor of at least one of the one or more computing nodes is communicatively coupled to one or more accelerators; and
a computer readable storage medium of the one or more computing nodes having program instructions embodied therewith, the program instructions executable by the processor to cause the system to:
receive, from an accelerator of the one or more accelerators, a set of metering rules, the metering rules including a unit of accelerator usage and a tariff per unit of accelerator usage, the unit of accelerator usage corresponding with an amount of work performed by the accelerator in executing data processing operations;
receive on a first bus from a partition of the one or more computing nodes a command block, the command block having data processing operations executable by the accelerator and a set of data to be processed;
calculate, based on the command block and the set of metering rules, an accelerator usage value for the partition;
transmit the command block to the accelerator for processing;
enable the accelerator to execute the command block; and
provide, on a second bus, the accelerator usage value.

8. The system of claim 7, wherein the unit of accelerator usage includes at least one of a number of a units of data per unit of time transferred to the accelerator from a processor of the one or more computing nodes per write operation, and a number of a units of data per unit of time transferred from the accelerator to the processor of the one or more computing nodes per read operation.

9. The system of claim 7, wherein the accelerator usage value includes at least one of a count of units of accelerator usage associated with executing operations of the command block, and a tariff associated with executing operations of the command block.

10. The system of claim 7, wherein the program instructions executable by the processor further cause the system to:
receive, from the accelerator, a digital signature to authenticate the set of metering rules; and
verify an authenticity of the digital signature to authenticate the set of metering rules.

11. The system of claim 7, wherein the program instructions executable by the processor further cause the system to:

update, in response to the calculating, a usage record associated with the accelerator, the usage record indicating at least one of a cumulative count of units of accelerator usage associated with the partition, and a cumulative count of accelerator usage values associated with the partition; and
provide, on the second bus, the usage record.

12. The system of claim 7, wherein the program instructions executable by the processor further cause the system to transmit the accelerator usage values to a service processor in response to receiving a read request from the service processor.

13. A computer program product for monitoring accelerator usage in a computing system having one or more accelerators, the computer program product including a computer readable storage medium having program instructions embodied therewith, wherein the computer readable storage medium is not a transitory signal per se, the program instructions executable by a processing circuit to cause the processing circuit to perform a method comprising:
receiving, from an accelerator in the computing system, a set of metering rules, the metering rules including a unit of accelerator usage and a tariff per unit of accelerator usage, the unit of accelerator usage corresponding with an amount of work performed by the accelerator in executing data processing operations;
receiving on a first bus from a partition of the computing system a command block, the command block having data processing operations executable by the accelerator;
calculating, based on the command block and the set of metering rules, an accelerator usage value for the partition;
transmitting the command block to the accelerator for processing;
enabling the accelerator to execute the command block; and
providing, on a second bus, the accelerator usage value.

14. The computer program product of claim 13, wherein the unit of accelerator usage includes at least one of a number of a units of data per unit of time transferred to the accelerator from a processor of the computing system per write operation, and a number of a units of data per unit of time transferred from the accelerator to the processor of the computing system per read operation.

15. The computer program product of claim 13, wherein the accelerator usage value includes at least one of a count of units of accelerator usage associated with executing operations of the command block, and a tariff associated with executing operations of the command block.

16. The computer program product of claim 13, further comprising:
receiving, from the accelerator, a digital signature to authenticate the set of metering rules; and
verifying an authenticity of the digital signature to authenticate the set of metering rules.

17. The computer program product of claim 13, wherein calculating comprises:
actuating one or more circuits of the accelerator to cause the accelerator to measure a number of units of accelerator usage used to execute data processing operations of the command block; and
determining an accelerator usage from the number of units of accelerator usage and the tariff per unit of accelerator usage.

18. The system of claim 7, wherein the processor includes one or more cores and a coherently attached processor proxy (CAPP), the CAPP including a usage monitoring program and a partition usage table,
   wherein each respective accelerator of the one or more accelerators includes a respective set of metering rules stored in a read-only memory of the respective accelerator, wherein each respective accelerator further includes processing circuitry and a software layer having an accelerator usage table.

19. The system of claim 18, wherein each accelerator of the one or more accelerators is configured to perform a different processing task, wherein the processing tasks include one or more selected from a group consisting of video compression, video rendering, database processing, pattern recognition, and image processing.

20. The method of claim 1, wherein the computing system includes a service processor, wherein the second bus is an out-of-band path, wherein the second bus is configured to issue commands to the service processor, and wherein each respective partition in the computing system includes a respective accelerator usage value for each accelerator.

* * * * *